April 2, 1946.  F. E. MENNEN  2,397,558
PINTLE
Filed Jan. 17, 1944  2 Sheets-Sheet 1
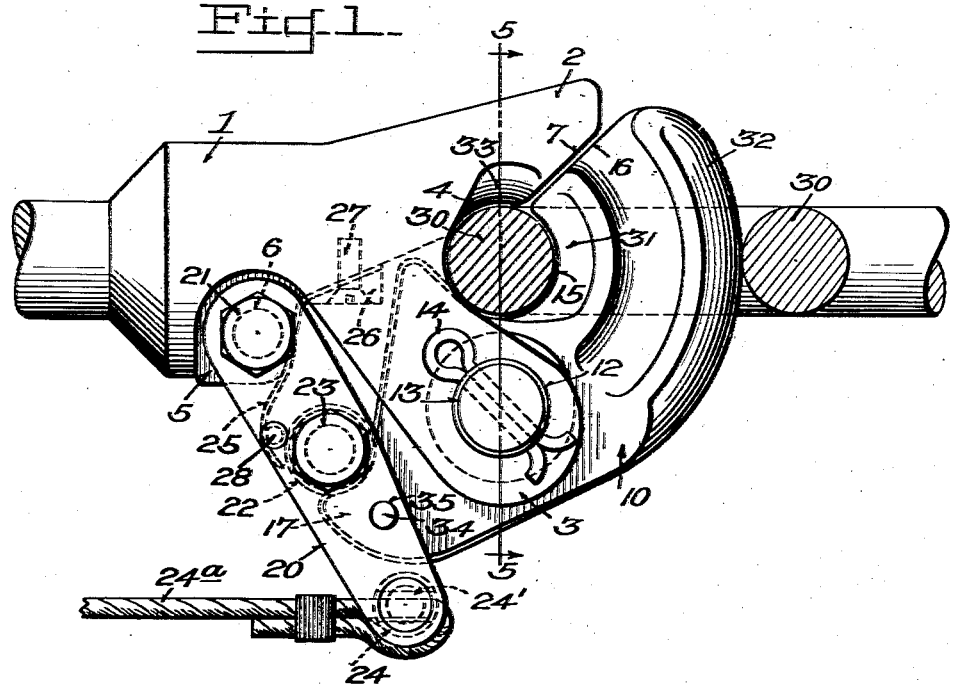
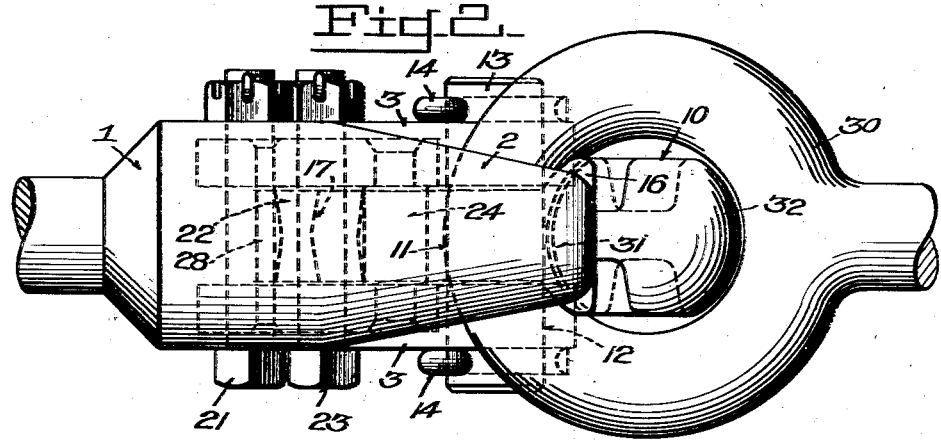
Inventor
FRANCIS E. MENNEN,

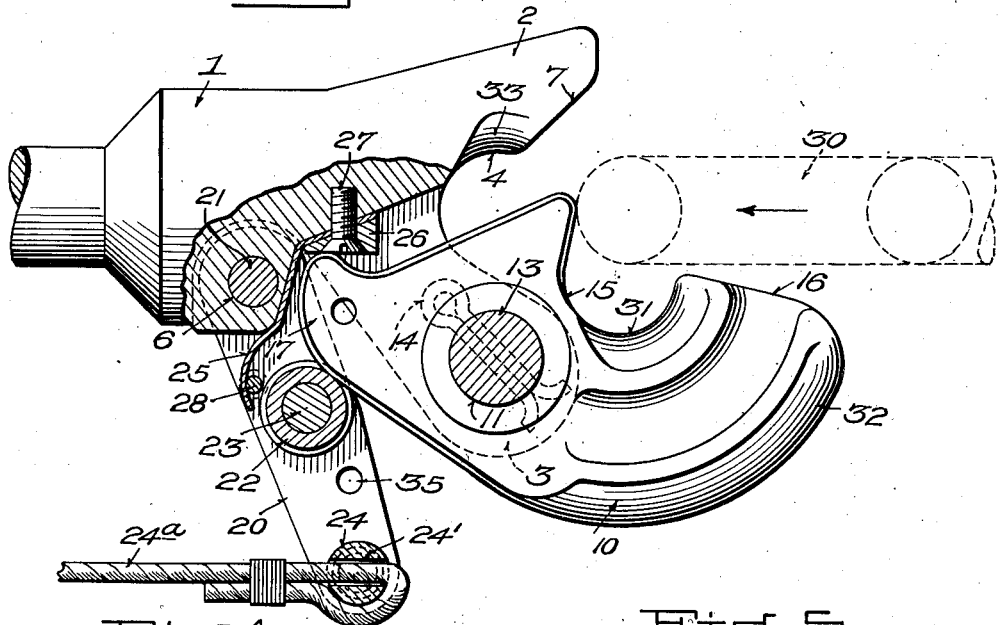
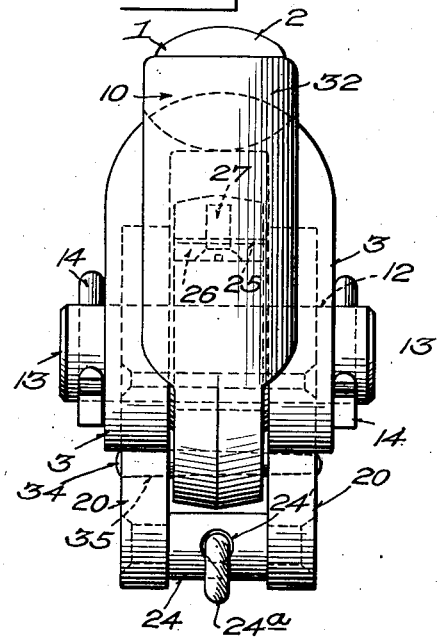
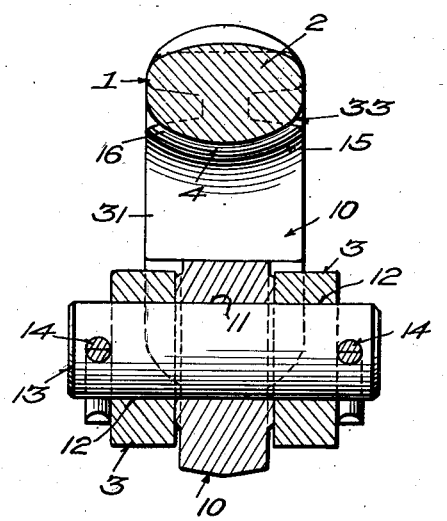

Patented Apr. 2, 1946

2,397,558

UNITED STATES PATENT OFFICE 2,397,558

PINTLE

Francis E. Mennen, Washington, D. C.

Application January 17, 1944, Serial No. 518,565

3 Claims. (Cl. 280—33.15)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel pintle for towing a vehicle. The principal object of the invention is to provide a pintle of simple and durable construction and capable of being used in various installations.

One of the more particular objects of the invention is to provide a quick-acting opening and closing means in the pintle. In this connection, the pintle is closed by means of a pivoted hook and is retained in the locked position by a spring-loaded locking arm. The same arm is also designed to retain the hook in the open position. The arm is in the form of a simple lever and is readily operated manually, for example, by a cord extending therefrom to the driver's seat on the towing vehicle.

Another object is to distribute wear and take up the play between the hook and the lunette. This object is accomplished by forming the nose of the hook with opposed convex surfaces lying in the outer surface of a torus segment. The cross-sectional diameter of this segment is only slightly smaller than that of the aperture in the lunette, so that the fit is reasonably close and the play between the parts is correspondingly reduced. The recess which receives the hook also has convex walls, with the result that there is a substantial arc of engagement between the pintle and the lunette at all probable angles of elevation between the parts.

An illustrative embodiment of the invention is disclosed in the following description and in the accompanying drawings in which:

Figure 1 is a side elevation of the device;

Figure 2 is a plan view;

Figure 3 is a side elevation, partly in section, of the device in open position;

Figure 4 is an end view, and

Figure 5 is a section on the line 5—5 of Figure 1.

The pintle includes a top member of head 1 from which extends a shank 2 for attachment to the towing vehicle in any suitable manner. The member 1 is tapered rearwardly, or towards the towed vehicle, as indicated by the numeral 2 and is forked to present a pair of cheeks 3 for receiving a locking hook, as will presently be shown. The fork is spaced angularly from the rear end of the member 1, and the vertex of the angle is rounded arcuately at 4 to receive the lunette. Directly forward of the fork 3, the head 1 is formed with a thinner section 5 having a transverse aperture 6 to receive a locking arm for the retaining hook, as will presently be shown. The rear end of the member 1 has its lower surface sloped downwardly and forwardly at 7 towards the curvature 4.

The retaining hook of the pintle is designated generally by the numeral 10 and is positioned within the branches of the fork 3, as clearly shown in Figure 5. The member 10 and the branches of the fork are formed with alined holes 11 and 12 respectively to receive a pivot pin 13 retained in position by suitable means such as cotter pins 14 engaging the outer surface of the fork. The upper edge of the hook has an arcuate cavity 15 complementary to the curvature 4 in the body 1 to form a complete circular opening when the device is in closed position. The upper edge portion 16 of the hook rearward of the surface 15 lies close to the surface 7 in the closed position. The forward end of the hook has a forward extension 17 for locking the hook in the closed position as will now be shown.

Two similar arms 20 are suspended from the section 5 by means of a pivot bolt 21 mounted in the aperture 6. Between their ends the arms carry a roller 22 also rotatably mounted on a bolt 23 passed through both arms. The lower ends of the arms carry a roller or finger piece 24 for manual operation of the arms. Against the crotch of the fork 3, one end of a flat spring 25 is clamped by means of a block 26 and a screw 27. The spring bears against the underside of the member 1, and its lower end exerts a rearward pressure on a cross pin 28 carried by and between the arms 20. Thus, the spring 25 urges the arms rearwardly, and in the closed position of the hook the locking roller 22 is seated upon the projection 17 of the hook to lock the hook in the closed position as shown in Figure 1.

The lunette 30 attached to the towed vehicle is of torus shape and is designed to be received in the closed opening 4, 15. The nose of the hook, or that portion rearward of the recess 15, is designed to be received in the center of the torus. As stated in the objects of the invention, it is desired to take up the play between the lunette and the hook and to distribute the wear between the front and rear contacting surfaces of those parts. With this purpose in view, the nose of the hook is dimensioned to fit rather closely in the lunette. Moreover, the forward and rear edges of the nose are formed as convex surfaces 31 and 32 respectively on a radius conforming to that of the aperture in the lunette. Similarly, the upper portion of the recess 4 is formed as a convex surface 33 on the sides of the taper 2. Whether the pintle is pulling or pushing on the lunette, the pressure is distributed over a substantial arc at all probable angles of elevation between the plane of the lunette and the horizontal axial plane of the pintle.

The pintle is opened by pulling rearwardly on the roller 24 to remove the roller 22 from the projection 17. For this operation the roller 24 has a diametrical opening 24' for attachment of a pull cord 24a. The lunette then withdraws freely from the hook, swinging the latter downward on its pivot 13 as shown in Figure 3. The opening movement of the hook is limited by contact with the block 26. When the pull on the roller 24 is released, the spring 25 brings the roller 22 to a position beneath the projection 17, wherein the hook is retained in the open position.

On subsequent insertion of the lunette in the pintle, the lunette is guided by the surface 7 towards the recesses 4 and 15. On striking the forward wall on the recess 15, the lunette swings the hook to closed position, while the projection 17 swings the arms 20 rearwardly and returns them to a position beneath the roller 22 as the latter is urged rearwardly by its actuating spring 25. In order to secure the lock more positively, a pin 34 may be passed through alined apertures 35 in the arms 20 and the forward end of the hook.

While a specific embodiment of the invention has been shown and been described, it will be understood that various alterations may be made without departure from the spirit of the invention as indicated by the appended claims.

What I claim is:

1. A pintle comprising a body, a hook pivotally attached thereto and having a forwardly extending locking projection, an arm pivotally mounted on said body rearwardly of said hook, means on said arm for engaging upon said projection to hold the hook in locking position, a spring urging said arm toward said hook, a block securing said spring to said body, said block being engageable by said projection in the open position of said hook.

2. A pintle having in combination a generally yoke-shaped body, the parallel side portions of said body being transversely connected at the rear by an angularly extending portion whose vertex is rounded arcuately to receive a lunette; a hook provided with a cammed surface on a rearward extension thereof pivotally mounted between the parallel side portions of the head, the said hook having an arcuate cavity upon its upper edge complementary to the curvature in the vertex of the said body to form a complete circular opening when the pintle is closed and a nose formed with opposed concave surfaces whereby pressure may be distributed over a substantial arc when the pintle is engaged within a lunette at varying angles of elevation; and means for locking and unlocking the said hook consisting of spring-urged arms pivoted upon the said body between the cheeks thereof and a roller member mounted on said arms, the said roller member cooperating with the cammed surface of the hook to automatically secure the hook in an open or closed position.

3. A pintle as in claim 2 wherein means are provided for remotely controlling the opening and closing of the pintle, said means comprising a cable cooperating with the spring-urged arms and roller member, and adapted to connect the said members with the driver's cab of a towing vehicle whereby the driver of the said vehicle may connect and disconnect the towed vehicle from his station in the said driver's cab.

FRANCIS E. MENNEN.